(12) United States Patent
Malipeddu et al.

(10) Patent No.: US 12,105,617 B2
(45) Date of Patent: Oct. 1, 2024

(54) METADATA COMPARISON OF APPLICATION PROGRAMMING INTERFACE (API) PAYLOADS

(71) Applicant: SAP SE, Walldorf (DE)

(72) Inventors: Ravikanth Malipeddu, Bangalore (IN); Ankit Dua, Kaithal (IN); Parmeshwar Lal, Rajasthan (IN); Aparna Vohra, Bangalore (IN)

(73) Assignee: SAP SE, Walldorf (DE)

( * ) Notice: Subject to any disclaimer, the term of this patent is extended or adjusted under 35 U.S.C. 154(b) by 101 days.

(21) Appl. No.: 17/964,349

(22) Filed: Oct. 12, 2022

(65) Prior Publication Data
US 2024/0126679 A1 Apr. 18, 2024

(51) Int. Cl.
*G06F 11/36* (2006.01)
(52) U.S. Cl.
CPC ...... *G06F 11/3684* (2013.01); *G06F 11/3664* (2013.01); *G06F 11/3688* (2013.01)
(58) Field of Classification Search
CPC ............. G06F 11/3684; G06F 11/3664; G06F 11/3688
See application file for complete search history.

(56) References Cited

U.S. PATENT DOCUMENTS

| | | | | |
|---|---|---|---|---|
| 7,676,794 B2 * | 3/2010 | Akiyama | ................... | G06F 8/30 717/124 |
| 9,983,985 B2 * | 5/2018 | Rai | ..................... | G06F 11/3692 |
| 10,496,532 B1 * | 12/2019 | Kaitha | ................ | G06F 11/3419 |
| 10,824,541 B1 * | 11/2020 | Kongara | .................... | G06F 8/71 |
| 11,288,172 B2 * | 3/2022 | Bhat | ..................... | G06F 18/214 |
| 11,907,775 B2 * | 2/2024 | Mohanty | ................ | G06N 20/00 |
| 2013/0152047 A1 * | 6/2013 | Moorthi | .............. | G06F 11/3664 717/124 |
| 2015/0007138 A1 * | 1/2015 | Sabetta | ............... | G06F 11/3684 717/124 |
| 2015/0020049 A1 * | 1/2015 | Caufield | ............. | G06F 11/3684 717/124 |
| 2017/0371937 A1 * | 12/2017 | Shah | ......................... | G06F 8/71 |
| 2018/0293156 A1 * | 10/2018 | Zeng | ................... | G06F 11/3684 |
| 2019/0294531 A1 * | 9/2019 | Avisror | ............... | G06F 11/3692 |
| 2020/0401382 A1 * | 12/2020 | Briggs | ...................... | G06F 8/60 |
| 2021/0216308 A1 * | 7/2021 | Vyas | ...................... | G06N 20/00 |

(Continued)

*Primary Examiner* — Douglas M Slachta
(74) *Attorney, Agent, or Firm* — Buckley, Maschoff & Talwalkar LLC (57) ABSTRACT

According to some embodiments, systems and methods are provided including an n-1 Application Programming Interface (API) including n-1 API metadata; an API automate, wherein the API automate is generated for the n-1 API; a memory storing processor-executable program code; and a processing unit to execute the processor-executable program code to cause the system to: receive an n API including n API metadata; execute the API automate with the n version API and output an API automate status; and in a case the API automate status is failed: compare the n API metadata and the n-1 API metadata; identify at least one difference between the n API metadata and the n-1 API metadata; generate an alert based on the identified at least one difference; and render a user interface, wherein the rendered user interface includes the alert. Numerous other aspects are provided.

17 Claims, 10 Drawing Sheets

(56) References Cited

U.S. PATENT DOCUMENTS

2023/0027880 A1\* 1/2023 Brown ................ G06F 11/3684
2023/0055527 A1\* 2/2023 Majithia ............. G06F 11/0772
2023/0376408 A1\* 11/2023 Wan ................... G06F 11/3688

\* cited by examiner

METADATA FILE

```
<Schema xmlns = "http:...." Namespace = "API_Sales_Order"..>
<Entity type Name = "A_Salesorder Type" label = "Sales Order Header" version = "1">
    <Key>
        <Property Ref. Name = "SalesOrder"/>
    </Key>
    <Property Name = "SalesOrder" Type = "Edm.String" MaxLength="10" Display-format ="UpperCase" Label="Sales Order"/>
    <Property Name= "SalesOrderType" Type = Edm.String" MaxLength="4" Display-format="UpperCase" Label="SalesOrderType"/>
    <Property Name="SalesOrganization" Type = Edm.String" MaxLength="4" Display-format="UpperCase" Label="SalesOrganization"/>
    <NavigationPropertyName= "To Billing Plan"/>
<Entity type Name = "Header Billing Plan" Label = "Header Billing Plan" version = "1">
    <Key>
        <Property Ref. Name = "SalesOrder"/>
        <Property Ref. Name = "Billing Plan"/>
    </Key>
    <Property Name ="SalesOrder" Type ="Edm.String" MaxLength="10" Display-format ="UpperCase" Label="Sales Order"/>
    <Property Name="BillingPlan" Type = Edm.String" MaxLength="10" Display-format="UpperCase" Label= "Billing Plan No." QuickInfo= "Billing PlanNumber/Invoicing Plan Number"/>
    <Property Name="BillingPlanStartDate" Type = Edm.String" MaxLength="4" Display-format="Date" Label="Start Date" QuickInfo= "Start Date for Billing Plan/Invoice Plan/>
....
```

```
CREATE API STEP
1. BASIC INFO.   2. CORRECTION TO SERVICE   3. ENTITY OPERATION   ④ MANDATORY
                                                                    PARAMETERS
                                                                    OR PAYLOAD

4. MANDATORY PARAMETERS OR PAYLOAD
              CODE VIEW ⊙ OFF — 610
PAYLOAD IN SMART VIEW
              604    304    609
        | PARAMETER          | VALUE |
        | ♡ ENTITY/HEADER    |       | — 608
  612 { | SALES ORDER*       | ABC   | — 606
        | 602 SALES ORDER TYPE |     |
        | SALES ORGANIZATION |       |
              614
        ( PREVIOUS )  ( GENERATE TEST )   ( CANCEL )
```

| ALERT | ACCEPTANCE REQUEST |
|---|---|
| THE MAXIMUM LENGTH FOR THE SALES ORDER HEADER PROPERTY OF THE SALES ORDER ENTITY HAS CHANGED FROM 10 TO 8 | DO YOU WANT TO ACCEPT THE UPDATED API?<br>■ YES<br>☐ NO<br>DO YOU WANT A SYSTEM-GENERATED UPDATED PAYLOAD?<br>■ YES<br>☐ NO<br>NEXT  CANCEL |

METADATA COMPARISON OF APPLICATION PROGRAMMING INTERFACE (API) PAYLOADS

BACKGROUND

Application Programming Interfaces (APIs) are a type of software interface that allows two or more computer programs to communicate with each other without any user intervention. In particular, the API is a collection of software functions/procedures (code) that allow unrelated software products to integrate and operate with other software and data, allowing data to be shared across system boundaries. Organizations may employ APIs to allow users to interface with and consume data from different applications. There are several types of APIs that are commonly used in web-based applications, including public and private. The type may indicate the intended scope of the use. A public API is open and available for use by any outside developer or organization. Public APIs typically involve moderate authentication and authorization. A private (or internal) API is intended only for use within the organization to connect systems and data within the organization. For example, an internal API may connect an organization's payroll and HR systems.

Increasingly, organizations are modifying software applications from software providers to customize the software that initially includes standard features. Since the software applications are modified, it is desirable for software providers to also provide open (public) APIs that may be used/consumed by the customized applications. These open/public APIs may include their own contract levels or restrictions and may undergo changes release over release. As such, when a new release is provided and there is a change in the API, organizations may be impacted, as the new release of the API may not be compatible with their applications. These incompatible changes may result in extra time and effort spent in debugging/resolving associated issues, as well as increasing the cost.

Systems and methods are desired which support API testing.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, Application Programming Interfaces (API)s are a type of software interface that allows two or more computer programs to communicate based on a set of rules that define how the applications or devices can connect and communicate with each other. The API enables an application or service to access a resource within another application or service, where the application/service doing the accessing is the client and the application/service containing the resource is the server. During development and/or delivery of a customized application, the customized application/features may be tested to ensure the application accurately performs as expected. In addition to the application itself being tested, the testing may include Application Programming Interface (API) test automation, API testing ("test automation") is a type of application/software testing where APIs are tested to determine if they meet expectations for functionality, reliability, performance and security. With automated API testing, a testing tool (e.g., SoapUI) is used to test the API with a test script/automate that simulates execution of the API. The test scripts/automates may use test data/payload in execution of the API. A payload is the part of the transmitted data or message of the data packet that is the actual intended message (e.g., minus headers attached for transport and minus descriptive meta-data), submitted by the API, for example, to a target system when a request is made. With respect to the payload and testing thereof, the test API payload may include a large set of fields which are available as part of the API signature. Before the request is sent to the target system, the fields may be filled in with values, and these values yield a particular output for this call/request. When the output is as expected based on the given input, the API has passed the test. Users may use an automated payload generation module to prepare payloads by entering data into fields to simulate the input to an API, thus enabling the user to generate a required payload.

Similarly, when a new or updated API is released, the organization may want to test the released API as they may be impacted by changes to the API. A release is the distribution of the newest version of a software application, including, for example, an API. Organizations periodically receive new APIs and/or new features for existing APIs. In the past, these releases were delivered once a year or once every two years. More recently, the releases occur more frequently (e.g., every 3 months, or monthly, or even weekly). There may be intentional changes with the updated API that may be planned according to compatibility rules (new/enhanced customizing or new process variants such as order type), which may result in changes to an organization's customized applications and/or automates used to test their customized applications and prior versions of the APIs. As a non-exhaustive example, consider an organization creates an API test automate in a particular release (n−1), which is executed successfully. Further, the customized application built to use the API is also successful. Then the system receives a new release (n) of the API. The organization executes the same automate created in the previous release (n−1) to transmit the payload created for the previous release to the new release (n) of the API, but due to changes in the API, the automate fails, which also impacts the customized application. The organization may now engage in debugging the payload information and performing a root cause analysis to determine the source of the failure, which may increase the time and effort used in application execution. A non-exhaustive example of that application execution may be end-to-end (E2E) scenario implementation/testing. An E2E scenario may include a sequence of process steps that may be supported by automation tools that execute program code to perform each of the steps automatically with minimal input from a user. The process steps may be chained together to complete the E2E scenario, whereby data created during execution of one of the process steps may be used by a next process step.

In some instances, the organization may be impacted by the API changes because they do not accept new or optional fields/code values in the updated API, resulting in noncompliance to compatibility rules. In some instances, the organization may be impacted by the API changes because they try to use the updated API in a different way from which it was intended (e.g., in a certain view), which may result in the API giving inappropriate results.

Additional non-exhaustive examples of types of changes reflected in the API metadata that may affect an API include, but are not limited to, type changes in the signature. For example, additional parameter(s)/field(s)/element(s) may be type changes that may affect the API as a potential receiver (e.g., target system) may not expect them (e.g., in events and messages sent, in synchronous service response). As another example, type changes of parameter/field/elements may be type changes that may affect the API as these changes to the value space may be shrinking the value space of data you receive which is incompatible or increasing the value space of data you send which is incompatible. Non-exhaustive examples of type changes to parameter/fields/elements include but are not limited to: numbers to characters; increase or decrease in field length (e.g., CHAR 18 to CHAR 40 or vice versa); adding values to code lists (including domain fixed values) (e.g., new gender (describing code), new order type (process driving code)); change error types (e.g., adding new errors); and cardinalities on associations (e.g., 1:1 to 1:n).

As such, it may be desirable to identify the changes to the APIs soon after they occur and in some instances prior to the organization accepting the update/release, as the later a change is identified, the more effort may be needed to debug and adapt to the changes.

By virtue of some embodiments, a test automation tool may be used to identify incompatible changes via an API automate. By virtue of some embodiments, a metadata comparison module is provided to identify a change in an updated API as compared to the immediately preceding version of the API. Embodiments may ensure metadata of a lower (preceding) release of an API may be compared with the real time metadata of a current release of an API. The user preference may then be used to create and adapt an API automate with suitable metadata.

As a non-exhaustive example, consider an object "Sales Order", a signature for the API that includes this object includes a maximum length for a field of the object. A lower version (n−1 version) of the API includes a maximum length of four (4) in the metadata that makes up the API signature, while the newly released version (n version) includes a maximum length of two (2) in the metadata that makes up the API signature. In embodiments, the metadata comparison module may identify the n-version of the API includes a maximum length of 2, which is not present in the n−1 version. Once the change is identified, the metadata comparison module may alert the user to the change via a notification, and then may prompt the user accept the change or not accept the change. Embodiments provide an early warning that identifies the changes to the API and prompts the user to accept the changes. This may help in safeguarding the application before production is impacted (preventative methodology). Additionally, the user may exert minimal effort to identify problems due to API incompatibility, as the changes are easily identified by the system. Embodiments may also provide for lower incidents of failed implementations of the new release. In a case the changes are accepted, the user may adapt their automate (via changes to an associated payload) to be successfully used by the updated API. In some embodiments, the metadata comparison module may propose an optimal payload that may be used by the same automate to ensure that the API execution and custom application implementation is not impacted, thereby avoiding the user having to generate a new automate for every API release. It is noted that the user does not have to accept the changed API. Rather, it is left to the discretion of the user to update the payload or not. As a non-exhaustive example, the user may not want to accept the changes, because they do not comply with other rules. In a case the payload is not updated, the automate and customized application implementation may fail due to the incompatibility of the new API. Embodiments may provide for a reduction in the overall process complexity and may minimize end to end implementation time and costs.

Figure 1:
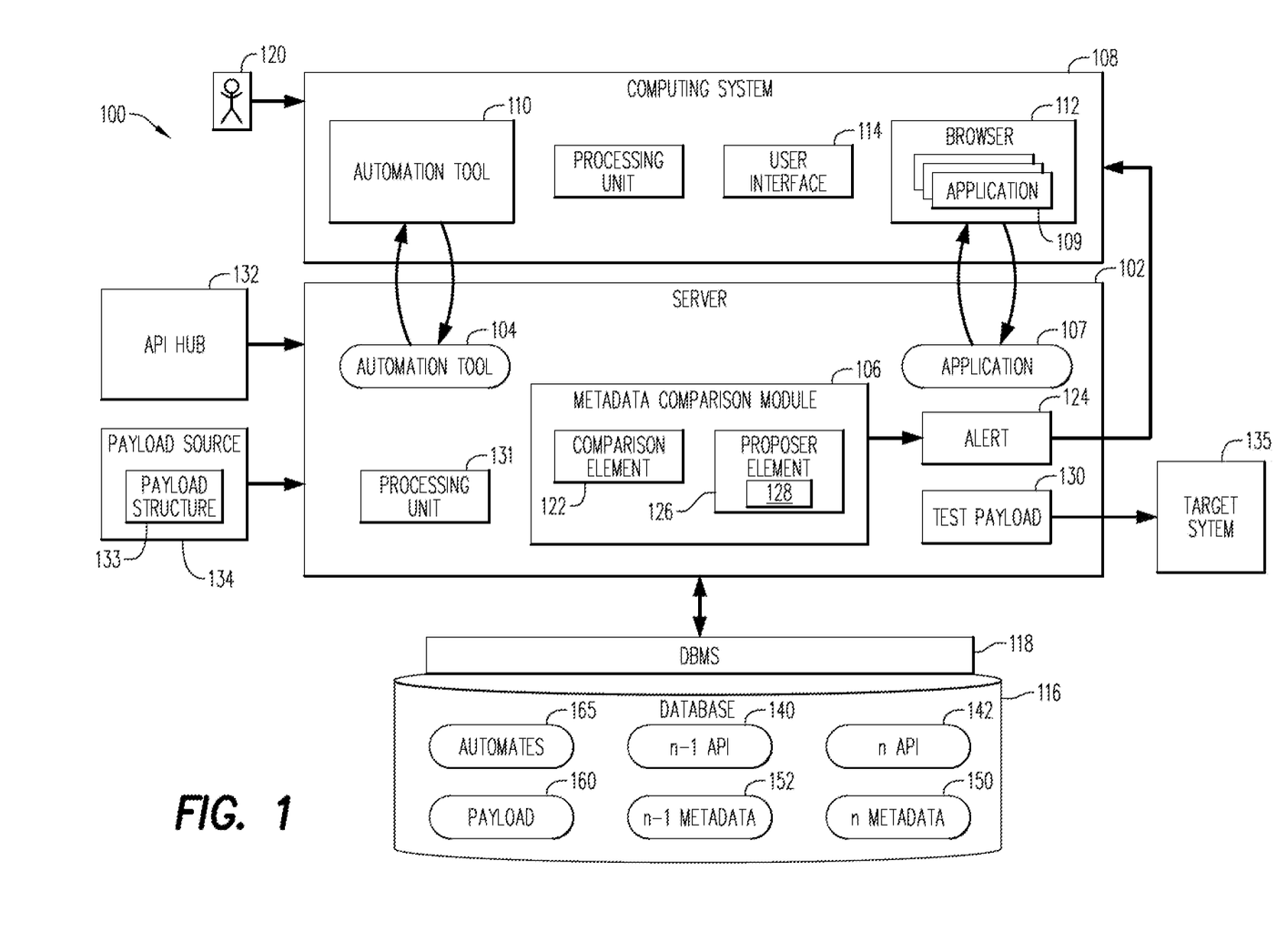
FIG. 1 illustrates a system according to some embodiments.

FIG. 1 is a block diagram of architecture 100 according to some embodiments. The illustrated elements of architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Architecture 100 includes a backend server 102 including a remote cloud-based automation tool 104 and a remote cloud-based application 107, a metadata comparison module 106, a local computing system 108 including a corresponding automation tool 110, browser 112 and user interface 114, a database 116, a database management system (DBMS) 118, and a client/user 120. As used herein, the terms "client", "user" and "end-user" may be used interchangeably.

The backend server 102 may include applications 107. Applications 107 may comprise server-side executable program code (e.g., compiled code, scripts, etc.) executing within the backend server 102 to receive queries/requests from clients 120, via the local computing system 108, and provide results to clients 120 based on the data of database 116, and the output of the metadata comparison module 106. A client 120 may access, via the local computing system 108, the metadata comparison module 106 executing within the server 102, to analyze an updated API (e.g., identify changes as compared to a previous version and identify payload values to adjust based on the identified changes), as described below.

The server 102 may provide any suitable interfaces through which users 120 may communicate with the metadata comparison module 106 or applications 107/109 executing thereon. The server 102 may include a Hyper Text Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

Local computing system 108 may comprise a computing system operated by local user 120. Local computing system 108 may comprise a laptop computer, a desktop computer, or a tablet computer, but embodiments are not limited thereto. Local computing system 108 may consist of any combination of computing hardware and software suitable to allow system 108 to execute program code to cause the system 108 to perform the functions described herein and to store such program code and associated data.

Generally, computing system 108 executes one or more of applications 109 to provide functionality to user 120. Applications 109 may comprise any software applications that are or become known, including but not limited to data analytics applications. As will be described below, applications 109 may comprise web applications which execute within a web browser 112 of system 108 and interact with corresponding remote cloud-based applications 107 to provide desired functionality. User 120 may instruct system 108 as is known to execute one or more of applications 107/109 and may interact with resulting displayed user interfaces 114 of the executing applications 107/109 to obtain the desired functionality therefrom.

The automation tool 110 may access data in the database 116 and then may reflect/show that information on a user interface 114. The automation tool 110 may fetch the data from the database 116 so that it is provided at runtime. While discussed further below, the database 116 may store data representing the API, the metadata, payload 160 and automates 165. It is noted that although the database 116 may store a previous (n–1) API 140, a newly released (n) API 142, n metadata 150, n–1-metadata 152, a payload 160 and automates 165, the viewing of the payload 160 is via the automation tool 110. Database 116 represents any suitable combination of volatile (e.g., Random Access Memory) and non-volatile (e.g., fixed disk) memory used by system 108 to store the data. Metadata 150/152 may comprise data that defines a structure/objects of the API. The payload 160 may comprise data defining the values for the objects in the API. The database 116 may also store one or more generated automates 165 that may be used to test the execution of API. Execution of the automate 165 may include performance by an API of activities in a sequence designated by the automation using a given payload. The automates 165 may be generated by any suitable automate-generation process including, but not limited to, a code-based method, a model-based method and a record-replay-based method.

Figure 9:
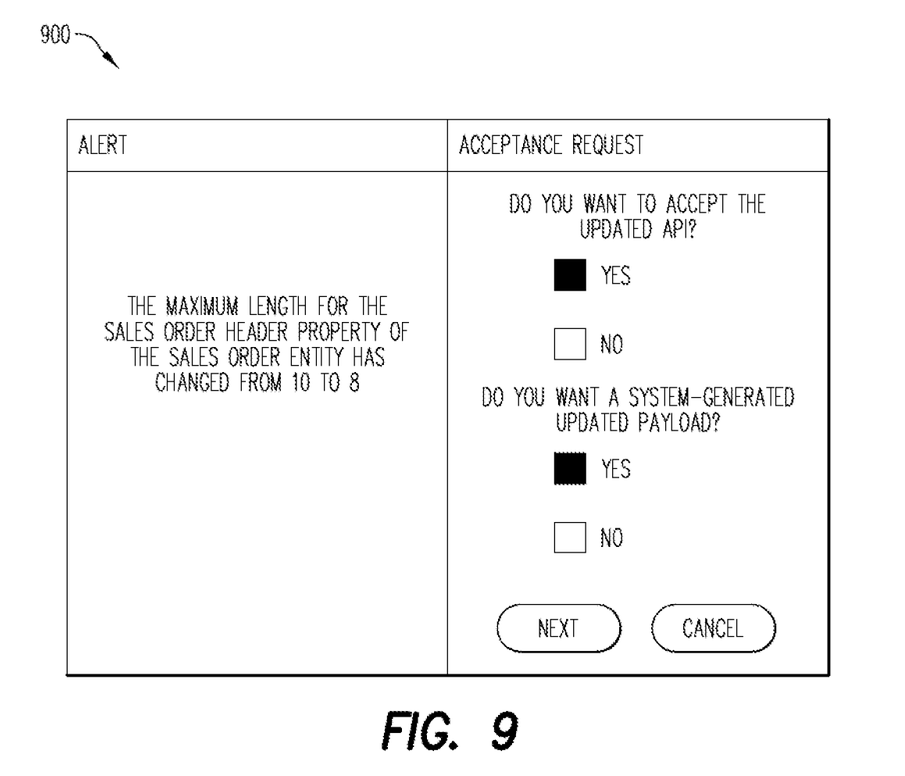
FIG. 9 illustrates a non-exhaustive example of a user interface according to some embodiments.

The metadata comparison module 106 may include a comparison element 122, and a proposer element 126. The comparison element 122 may execute program code to select each entity, property and attribute in the n metadata 150 that forms an API signature for the n API 142 and identify a corresponding entity, property and attribute in the n–1 metadata 152 that forms the API signature for the n–1 API 140. In a case the corresponding entity, property, and attribute is absent from the n–1 metadata 152, thereby denoting a change in the n API 142, the metadata comparison module 106 generates an alert 124. The alert 124 may be transmitted to the local computing system 108 and rendered on the user interface 114/900 (FIG. 9).

The proposer element 126 may include program code to deliver an Acceptance Request User Interface (UI) 900 (FIG. 9) to the computing system 108. It is noted that in some embodiments, the Acceptance Request UI 900 may include the rendered alert 124. As described further below, a user 120 may request the system 100 to provide an updated payload via the Acceptance Request UI 900. The proposer element 126 may include an analyzer engine 128. For every request to provide the updated payload, the analyzer engine 128 may execute program code to determine how the payload may be updated and the proposer element 126 may then provide proposals for the update based on the output of the analyzer engine 128. Continuing with the non-exhaustive example described above regarding the maximum length change, for the n–1 API 140, the maximum length was 4 and the payload parameter value was "1010." With the n API 142, the maximum length has been changed to 2, and the proposer element 126 may output onto a user interface a proposal to change the length of the payload parameter value to two characters (e.g., "Change value for Sales Order object to have a maximum of two (2) characters"). In some embodiments, the proposer element 126 may change the payload parameter value automatically after receipt of user request to provide the updated payload. As a non-exhaustive example, the proposer element 126 may use previous executions, log history, a machine learning algorithm, etc. to upload and update the payload so that the automate is successfully executed.

One or more applications 107/109 executing on backend server 102 or local computing system 108 may communicate with DBMS 118 using database management interfaces such as, but not limited to, Open Database Connectivity (ODBC) and Java Database Connectivity (JDBC) interfaces. These types of applications 107/109 may use Structured Query Language (SQL) to manage and query data stored in database 116.

DBMS 118 serves requests to store, retrieve and/or modify data of database 116, and also performs administrative and management functions. Such functions may include snapshot and backup management, indexing, optimization, garbage collection, and/or any other database functions that are or become known. DBMS 118 may also provide application logic, such as database procedures and/or calculations, according to some embodiments. This application logic may comprise scripts, functional libraries and/or compiled program code. DBMS 118 may comprise any query-responsive database system that is or becomes known, including but not limited to a structured-query language (i.e., SQL) relational database management system.

Backend server 102 may provide application services (e.g., via functional libraries) which applications 107/109 may use to manage and query the data of database 116. The application services can be used to expose the database data model, with its tables, hierarchies, views and database procedures, to clients. In addition to exposing the data model, backend server 102 may host system services such as a search service.

Database 116 may store data used by at least one of: applications 107/109 and the metadata comparison module 106. For example, database 116 may store the API metadata which may be accessed by the metadata comparison module 106 during execution thereof.

Database 116 may comprise any query-responsive data source or sources that are or become known, including but not limited to a structured-query language (SQL) relational database management system. Database 116 may comprise a relational database, a multi-dimensional database, an extensible Markup Language (XML) document, or any other data storage system storing structured and/or unstructured data. The data of database 116 may be distributed among several relational databases, dimensional databases, and/or other data sources. Embodiments are not limited to any number or types of data sources.

Presentation of a user interface as described herein may comprise any degree or type of rendering, depending on the type of user interface code generated by the backend server 102/local computing system 108.

For example, a client 120 may execute a Web Browser to request and receive a Web page (e.g., in HTML format) from a website application 107 of backend server 102 to provide the UI 400/500/600/700/900 via HTTP, HTTPS, and/or Web Socket, and may render and present the Web page according to known protocols.

API Hub 132 may store a plurality of APIs that may be automated. This may include both OData APIs and SOAP APIs.

Figure 2:
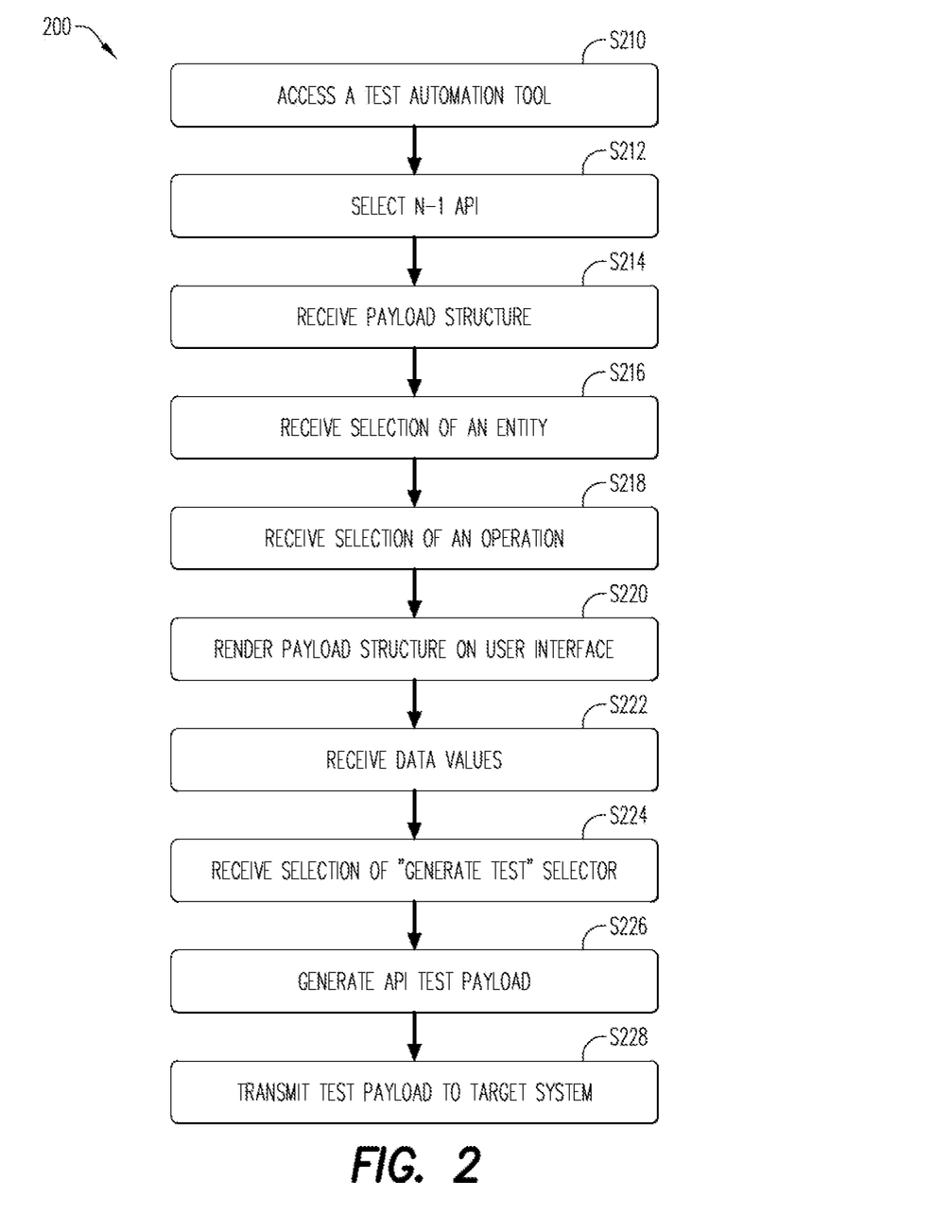
FIG. 2 is a flow diagram of a process according to some embodiments.
Figure 8:
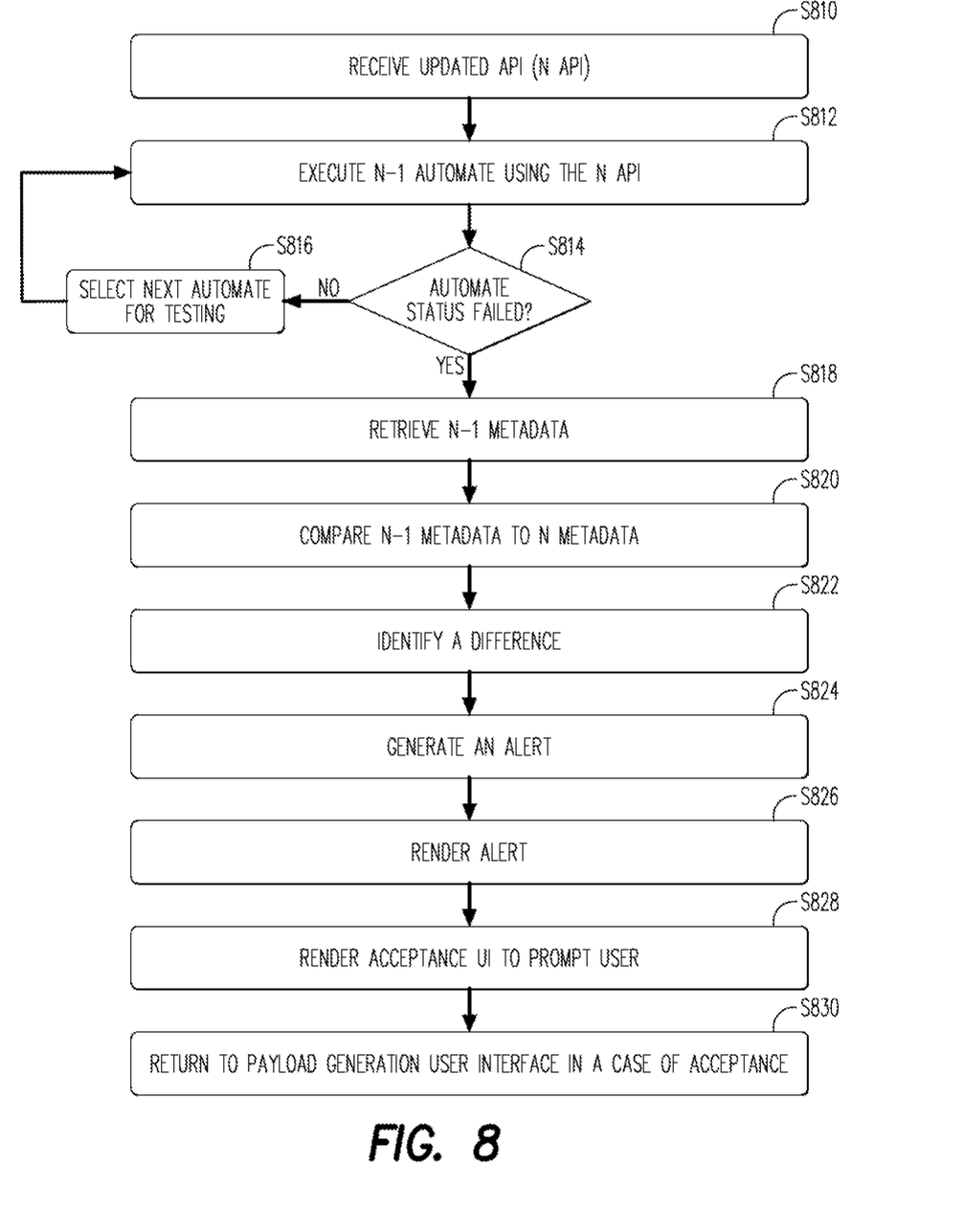
FIG. 8 illustrates a flow diagram of a process according to some embodiments.

FIGS. 2 and 8 illustrate a method 200 of generating a payload for use by an API automate; and a method 800 of identifying changes in a current release of an API, respectively, in accordance with an example embodiment. For example, the methods 200/800 may be performed by a database node, a cloud platform, a server, a computing system (user device), a combination of devices/nodes, or the like, according to some embodiments. In one or more embodiments, the computing system 108 or backend server 102 may be conditioned to perform the process 200/800, such that a processing unit 131 (FIG. 1) of the system 100 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
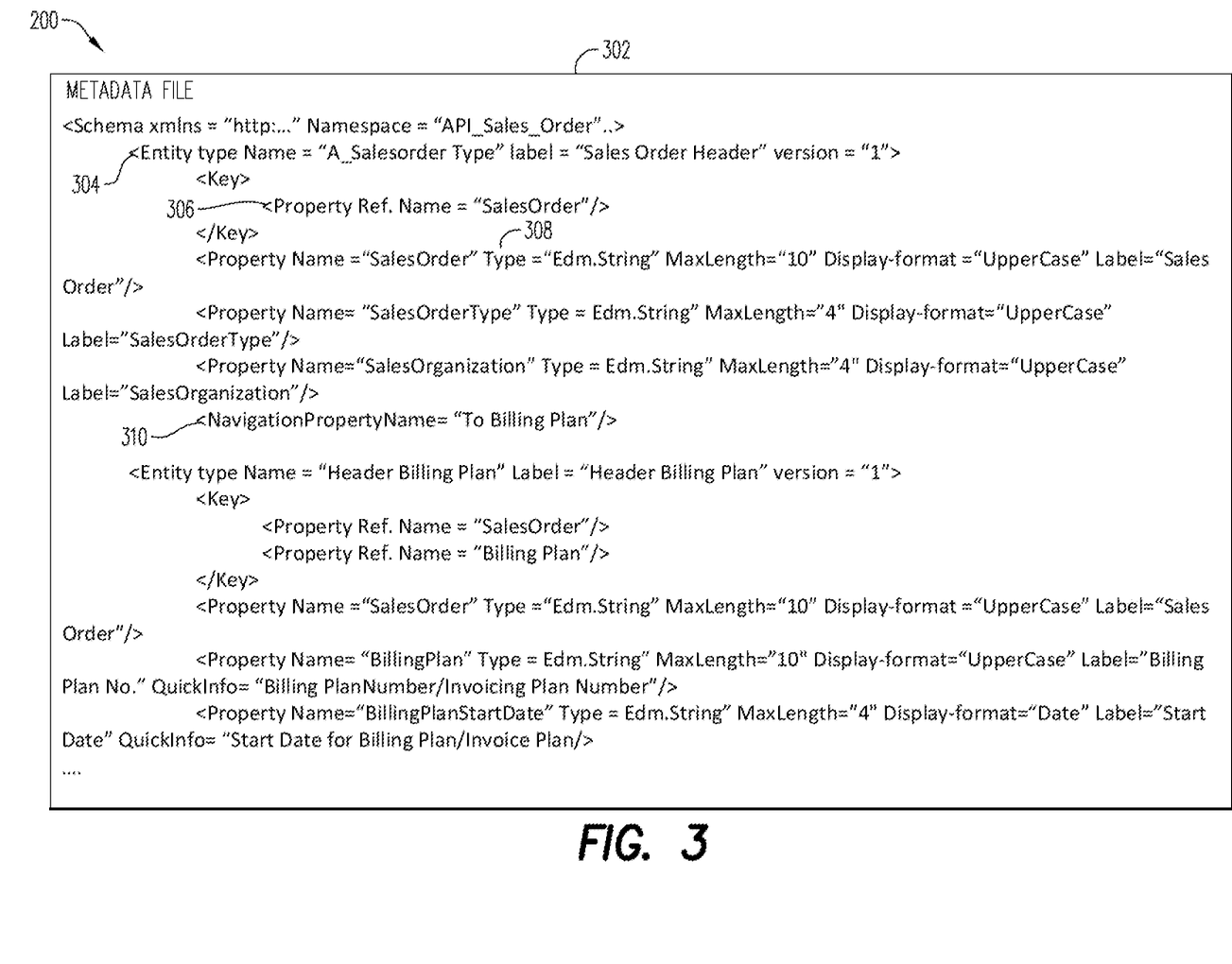
FIG. 3 illustrates a non-exhaustive example of a metadata file according to some embodiments.

Initially, at S210 the test automation tool 110 is accessed. At S212, an n−1 API 140 to automate is selected. In some embodiments, a list of whitelisted APIs available for automation may be received from an API Hub 132. The list may include OData APIs and SOAP APIs, for example. Each API may be created for a given business object. The business object represents real objects such as orders, customers or articles. The user may select the n−1 API 140 based on the process they would like to automate. Continuing with the Sales Order use case example described above, the user may select the n−1 API 140 for the Sales Order. After selection, and based thereon, a payload structure 133 for the selected API is received from a payload source 134 at S214. The payload source 134 may be a public or private repository of payload structures 133. The payload structure 133 may include the different fields for the given payload but may not include any values for the different fields. In some embodiments, the payload structure 133 may be received as metadata 302 (FIG. 3) in a metadata file 300 in HTML format or JSON format. For example, a structure of the payload for the automate generated for the n−1 API is the n−1 metadata, while a structure of the payload for the updated automate for the n API (described further below) is the n metadata. The metadata 302 may include the technical information for every field in the payload structure 133.

In some embodiments, each API may include a plurality of entities 304. Entities 304 are data structures that can be associated as an instance of a transaction. An entity is a version of a business object that can be stored and manipulated by applications. In the non-exhaustive example shown in FIG. 3, for the SalesOrder API there are two entities: one with a Sales Order Header label and one with a Header Billing Plan label. While the non-exhaustive example herein shows two entities for the Sales Order API, this is for ease of explanation, and a Sales Order API may have, for example 25-30 entities. Each entity 304 may include one or more properties 306 that define the entity. Further, each property 306 may include one or more attributes 308. Continuing with the non-exhaustive example in FIG. 3, for the property 306 with property name "SalesOrder", the attributes 308 are "Type", "MaxLength", "Display-format" and "Label." Each attributes 308 may be a key-value pair and have particular definitions per this API. For example, "Type" indicates the type of values that may be received in this field (e.g., String, Integer, etc.), and in the example in FIG. 3 this is defined as "Edm.String". "MaxLength" indicates the maximum number of characters for the value that may be included in the field, and in the example in FIG. 3 this is defined as "10". "Display-format" indicates how the value may be displayed in the field (Uppercase, Date, etc.), and in the example in FIG. 3 this is defined as "Uppercase". "Label" indicates the name of the property to be displayed on the User Interface and in the example in FIG. 3 this is defined as "Sales Order". Additionally, the entities 304 for the API may be linked together. Evidence of the linking may be via the <NavigationPropertyName> code 310. Continuing with the non-exhaustive example in FIG. 3, the Sales Order Header entity includes a linkage 310 to "Header Billing Plan" entity via the linkage code 310<NavigationPropertyName="To Billing Plan"/>.

Figure 4:
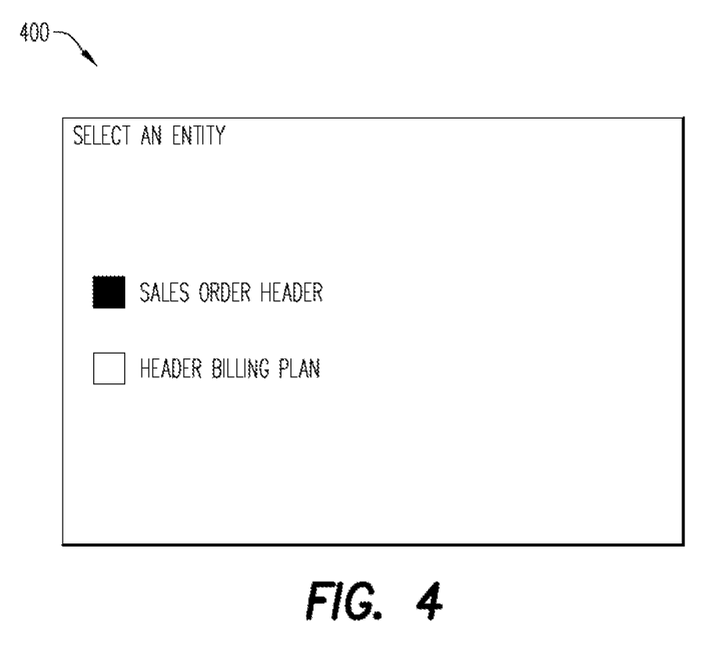
FIG. 4 illustrates a non-exhaustive example of a user interface according to some embodiments.
Figure 5:
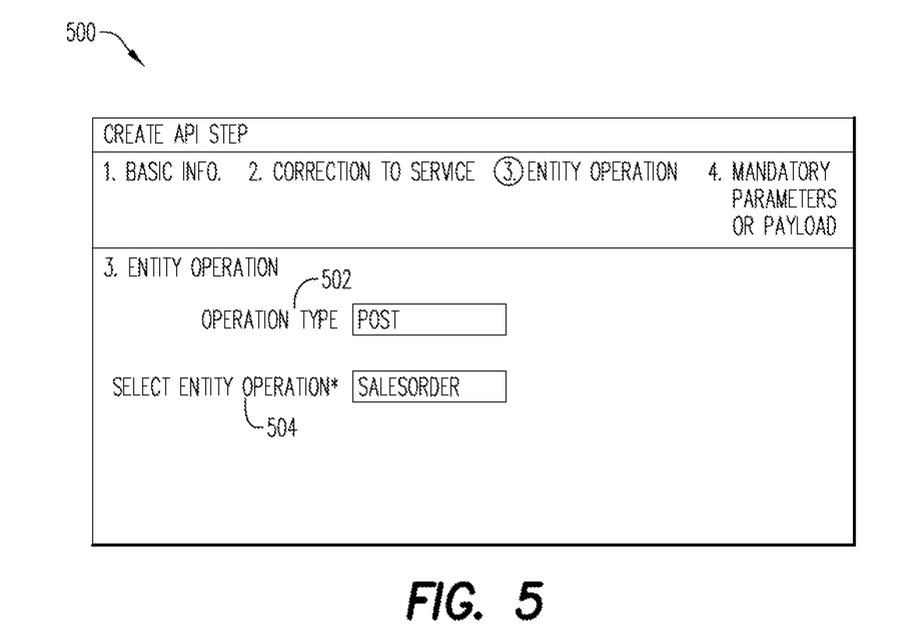
FIG. 5 illustrates a non-exhaustive example of a user interface according to some embodiments.

Turning back to the process 200, in S216 an entity 304 is selected for automation. As a non-exhaustive example, FIG. 4 provides a user interface 400 for selection of the entity 304. Continuing with our example, the user has selected the Sales Order Header. In some embodiments, an operation (e.g., POST, GET, PATCH, DELETE) may be selected for the selected entity in S218. Continuing with the non-exhaustive example, FIG. 5 provides a user interface 500 for selection of the operation for the entity. Herein, the "Post" operation was selected in the "Operation Type" field 502 as this is the operation to create a Sales Order. In some embodiments, there may be several entities with an associated POST operation, and the user may select the particular entity to which the operation will be applied via the "Select Entity Operation" field 504.

Figure 6:
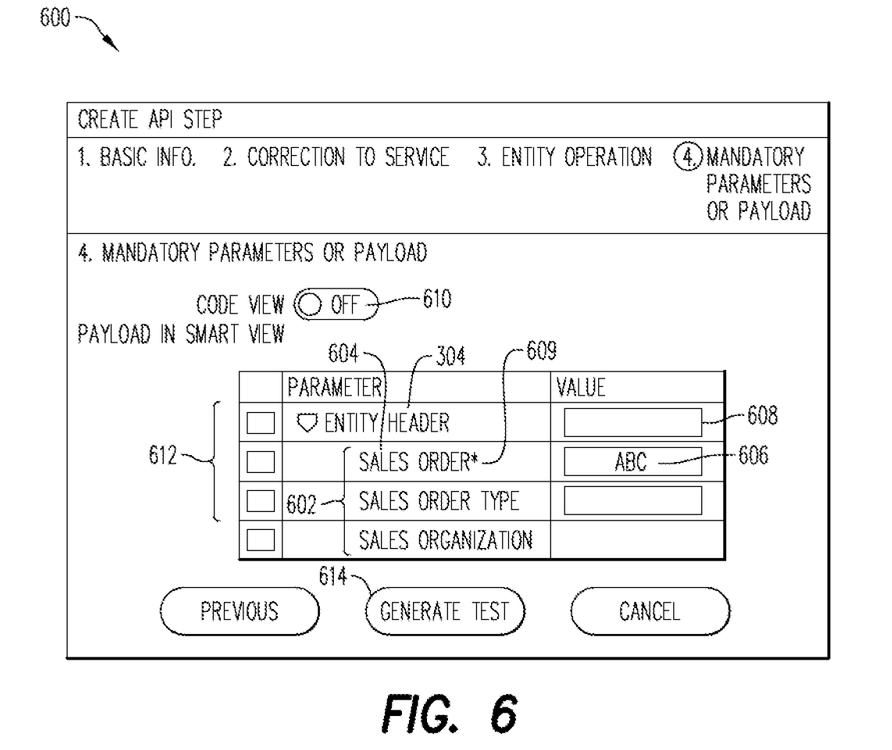
FIG. 6 illustrates a non-exhaustive example of a user interface according to some embodiments.

In S220, the payload structure 133 for the selected entity 304 may be rendered on a User Interface 600 (FIG. 6). The user interface 600 may list the properties from the metadata as "Parameters" 602 and may include the labels 604 for these properties. The user may enter a data value 606 for each of the label 604 in a data entry field 608 in S222. The data value 606 may be received via free-form text, drop-down menu, radio button or any other suitable data-entry method. In some embodiments, the label may include a mandatory parameter indicator 609 (e.g., an asterisk) in a case the parameter is required for execution of the payload.

Figure 7:
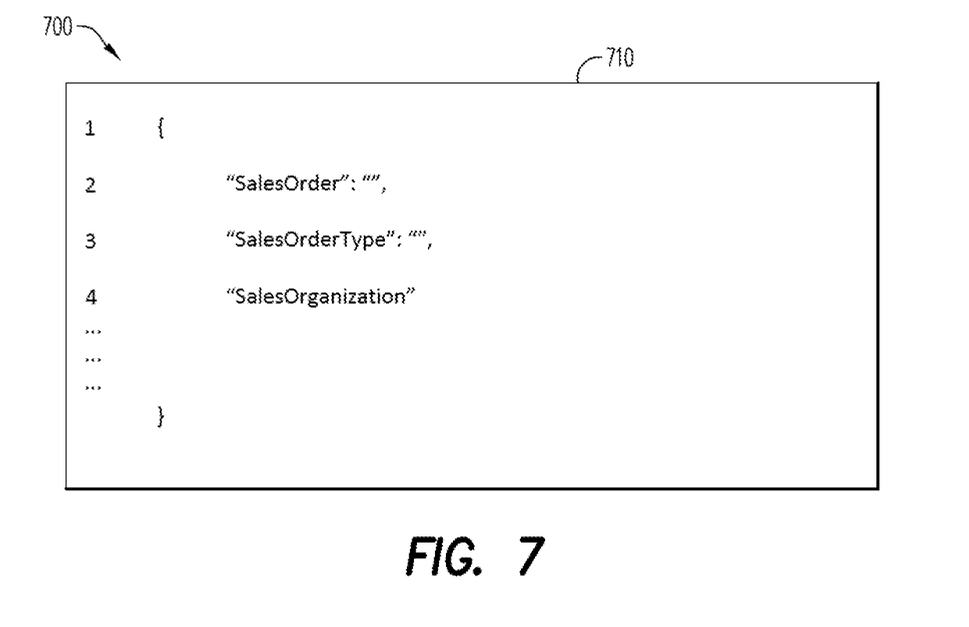
FIG. 7 illustrates a non-exhaustive example of a code view of an API payload according to some embodiments.

In one or more embodiments, the user interface 600 may include a toggle button 610, or another selector, that may allow a user to view the payload structure 133 as the data-entry field view 612 when in the "off" position, as shown in FIG. 6, or as a code-view 710 when in the "on" position (not shown) resulting in the user interface 700 of FIG. 7.

After the data values 606 are received at least in the data-entry fields 608 for the required parameters, the user may select a "Generate Test" selector 614 at S224 to generate the API test payload 130 for use by an API automate 165 at S226. As described above, the automates 165 may use API test payload in execution of the API. The test payload 130 may include all of the values received by the user interface 600. The test payload may then be transmitted to a target system 135 to used in execution of the API test/automate S228. In a case the target system 135 returns expected values in response to execution of the automate using the test payload, the API operates as expected and is successful. In some embodiments, the application using the API may be tested by invoking the API using the same test payload 130. In a case the target system 135 returns expected values, the application operates as expected and the API is successful. In some embodiments, the metadata for a given API (e.g., n−1 metadata 152), API (e.g., n−1 API 140), automate 165 and API test payload 130/160 may be saved in the database 118.

Turning to FIG. 8 a method 800 for identifying changes in a current release of an API is provided. Initially, at S810, an updated version of an API (n API 142) is received including updated metadata (n metadata 150). Then in S812, using the metadata comparison module 106, an automate 165 generated for the n−1 API ("n−1 automate") is executed using the n API 142 and the API test payload 130 created for the n−1 API 140 which conforms to the n−1 metadata 152. In some embodiments, an identification of the entity (e.g., Entity type name) that has been updated is received with the N−1 API 142 so that the metadata comparison module 106 may select a particular automate and API test payload (e.g., that matches the Entity type name) for execution. In a case that the updated entity is not identified, the metadata comparison module 106 may execute each of the automates and API test payloads for the n−1 API 140.

Next, it is determined at S814 whether the executed automate 165 has a status of pass or fail. In one or more embodiments, the metadata comparison module 106 may determine the executed automate 165 has a pass status in a case that the output matches an expected output, and may determine the executed automate 165 has a fail status in a case that the output does not match the expected output. In a case the executed automate 165 has a pass status, the process 800 proceeds to S816 and an automate for another entity stored for the n API may be selected for testing at S812. In a case the executed automate 165 has a fail status, the process 800 proceeds to S818 and the metadata comparison module 106 retrieves the n−1 metadata 152 for the tested entity with the fail status. Then in S820 the comparison element 122 compares the retrieved n−1 metadata 152 for the tested entity with the fail status to the n metadata 150 for the n API 142. In some embodiments, the comparison element 122 may select each entity, property and attribute in the n metadata 150 and identify a corresponding entity, property and attribute in the n−1 metadata 152. It is noted that the placement of the entity in each version of the metadata (n and n−1) may be different (e.g., in the n metadata the Sales Order entity is at line 2 while in the n−1 metadata the Sales Order entity is at line 20). In S822 the comparison element 122 identifies at least one difference between the n metadata 150 and the n−1 metadata 152, such that there is not an exact match between the n metadata 150 and the n−1 metadata 152. In particular, the comparison element 122 may identify at least one of a corresponding entity, property, and attribute is absent from the n−1 metadata 152, thereby denoting a change in the n API 142. As a non-exhaustive example, a corresponding property does not exist in a case the corresponding property is not an exact match to the selected property. It is noted that the change is the reason the test of the automate created for the n−1 API failed when tested with the n API, as the metadata of the n API was not recognized by the automate, and therefore the values in the test payload were not recognized. Then in S824 the metadata comparison module 106 generates an alert 124. The alert 124 may be transmitted to the local computing system 108 and rendered on the user interface 114 in S826. The alert 124 may indicate that the API has changed and may include further information about how it has changed (e.g., "The MaxLength for the Sales Order Header Property of the Sales Order entity has changed.")

Continuing with the non-exhaustive example described above, a difference may be identified for the Sales Order entity, and property Sales Order Header. For example, the n−1 metadata 152 includes a MaxLength attribute of 10, while the n metadata 150 includes a MaxLength of 8 for the Sales Order entity and property Sales Order Header. As another example of an identifiable difference for the Sales Order entity, a property of Sales Order Header is present in the n−1 metadata but is absent from the n metadata. Alternatively, as yet another example of an identifiable difference for the Sales Order entity, a property of Billing Item is absent from the n−1 metadata but is present in the n metadata.

Turning back to the process 800, the proposer element 126 may then render an Acceptance Request User Interface (UI) 900 in S828 to prompt the user to either accept the updated n API or reject the updated n API. The user may accept or reject the n API via a selector on a user interface. In a case the user rejects the n API at S828, the process may end. As described above, the user may reject the n API for any number of reasons including, but not limited to, the change may not be in compliance with other rules at the organization. In a case the user accepts the n API at S828, the process proceeds to S830 and the user may be returned to the user interface 600 of FIG. 6 to input updated values based on the changes to generate an updated payload for the n API. The automate using the updated payload may be an "updated API automate". In some embodiments, the updated value replaces a value in the payload of the automate for the n−1 API, resulting in the updated API automate. In other embodiments, the entry of a new value in the payload of the automate for the n−1 API results in the updated API automate. For example, in a case of a new field in the n API, a new value is input in the payload, but it does not replace another value. In some embodiments, acceptance of the n API may result in execution of the proposer element 126 and analyzer engine 128. As described above, for every request to accept the n API, the analyzer engine 128 may execute program code to determine how the payload may be updated and the proposer element then may provide proposals for the update based on the change output of the analyzer engine 128.

Continuing with the non-exhaustive example described above regarding the maximum length change, for the n−1 API 140, the maximum length was 4 and the payload parameter value 606 was "1010." With the n API 142, the maximum length has been changed to 2, and the proposer element 126 may output onto a user interface a proposal to change the length of the payload parameter value to two characters (e.g., "Change value for Sales Order object to have a maximum of two (2) characters"). In some embodiments, the proposer element 126 may change the payload parameter value automatically after receipt of user request to provide the updated payload. As a non-exhaustive example, the proposer element 126 may use previous executions, log history, a machine learning algorithm, etc. to upload and update the payload so that the automate is successfully executed.

Figure 10:
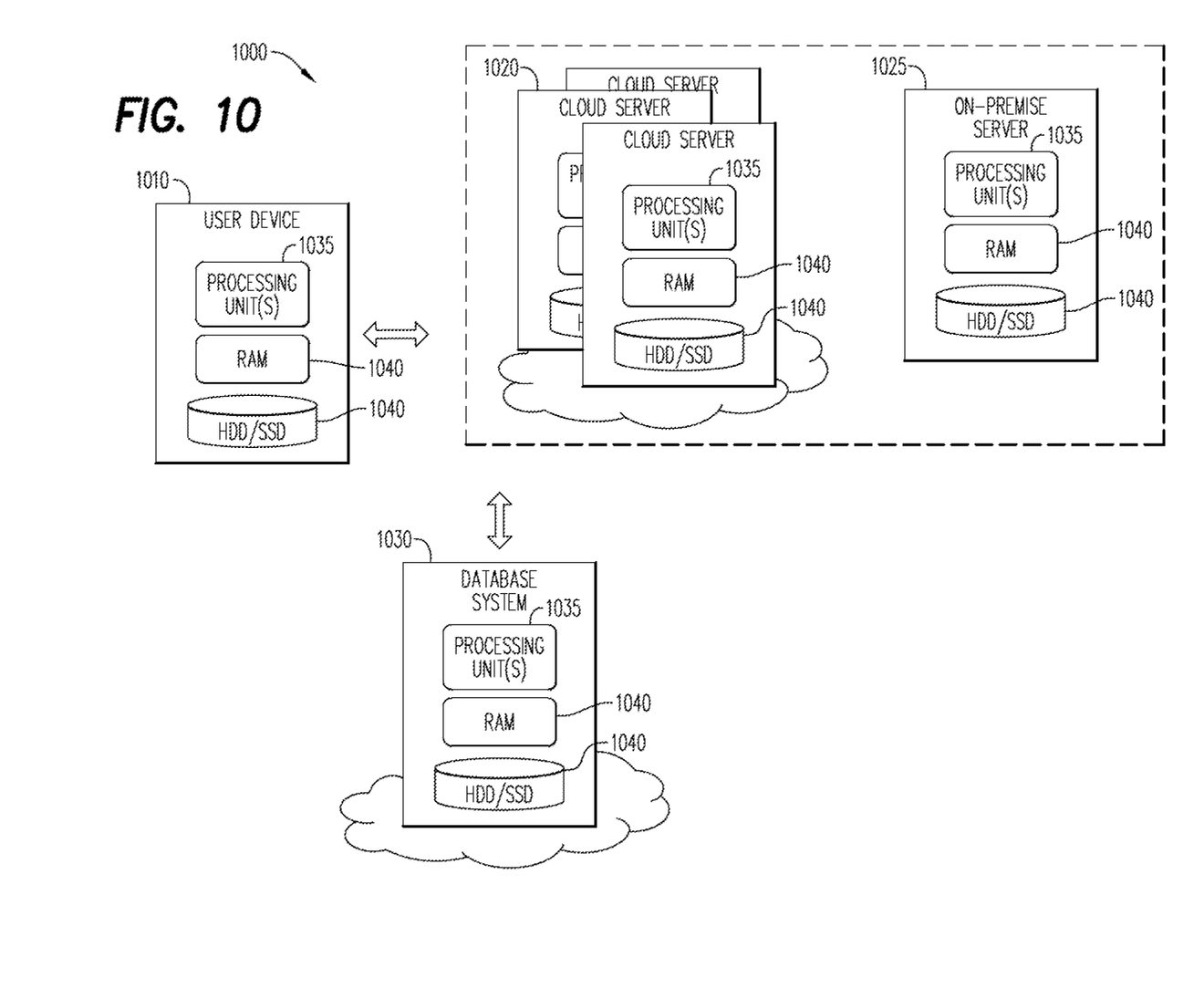
FIG. 10 is a block diagram of a cloud-based database deployment architecture according to some embodiments.

FIG. 10 illustrates a cloud-based database deployment 1000 according to some embodiments. The illustrated components may reside in one or more public clouds providing self-service and immediate provisioning, autoscaling, security, compliance and identity management features.

User device 1010 may interact with applications executing on one of the cloud application server 1020 or the on-premise application server 1025, for example via a Web Browser executing on user device 1010, in order to create, read, update and delete data managed by database system 1030. Database system 1030 may store data as described herein and may execute processes as described herein to cause the provision of updated APIs/extensions for use with the user device 1010. Cloud application server 1020 and database system 1030 may comprise cloud-based compute resources, such as virtual machines, allocated by a public cloud provider. As such, cloud application server 1020 and database system 1030 may be subjected to demand-based resource elasticity. Each of the user device 1010, cloud server 1020, on-premise application server 1025, and database system 1030 may include a processing unit 1035 that may include one or more processing devices each including one or more processing cores. In some examples, the processing unit 1035 is a multicore processor or a plurality of multicore processors. Also, the processing unit 1035 may be fixed or it may be reconfigurable. The processing unit 1035 may control the components of any of the user device 1010, cloud server 1020, on-premise application server 1025, and database system 1030. The storage devices 1040 may not be limited to a particular storage device and may include any known memory device such as RAM, ROM, hard disk, and the like, and may or may not be included within a database system, a cloud environment, a web server or the like. The storage 1040 may store software modules or other instructions/executable code which can be executed by the processing unit 1035 to perform the method shown in FIGS. 2 and 8. According to various embodiments, the storage device 1040 may include a data store having a plurality of tables, records, partitions and sub-partitions. The storage device 1040 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
a particular release (n-1) Application Programming Interface (API) including an n-1 API metadata;
an API automate, wherein the API automate is generated for the n-1 API;
a memory storing processor-executable program code; and
a processing unit to execute the processor-executable program code to cause the system to:
receive a new release (n) API including an n API metadata;
execute the API automate with the n API and output an API automate status; and
in a case the API automate status is failed:
compare the n API metadata and the n-1 API metadata;
identify at least one difference between the n API metadata and the n-1 API metadata;
generate an alert based on the identified at least one difference;
render a user interface, wherein the rendered user interface includes the alert;
receive selection at the user interface of an acceptance instruction, in response to rendering of the generated alert;
receive at least one updated value for a payload of the API automate, the payload including test data; and
generate an updated API automate including an updated payload for the n API.

2. The system of claim 1, wherein:
a structure of the payload for the API automate is the n-1 API metadata; and
a structure of the updated payload for the updated API automate is the n API metadata.

3. The system of claim 1, wherein the updated payload includes the at least one updated value.

4. The system of claim 3, wherein the updated value replaces a value in the payload of the API automate for the n-1 API resulting in the updated API automate.

5. The system of claim 1 wherein each of the n API metadata and the n-1 API metadata includes at least one entity including one or more properties, and each property includes one or more attributes.

6. The system of claim 5, wherein each attribute is a key-value pair.

7. The system of claim 5 further comprising a metadata comparison module adapted to identify the at least one difference between the n API metadata and the n-1 API metadata.

8. The system of claim 5, wherein identification of at least one difference further comprises:
selecting each property in the n API metadata;
determining whether a corresponding property exists in the n-1 API metadata; and
in a case the corresponding property does not exist, the at least one difference is identified.

9. The system of claim 8, wherein the corresponding property does not exist in a case the corresponding property is not an exact match to the selected property in the n API metadata.

10. A method comprising:
generating an API automate for a particular release (n-1) API, the n-1 API including n-1 API metadata;
receiving a new release (n) API including n API metadata;
comparing the n API metadata to the n-1 n API metadata;
identifying at least one difference between the n API metadata and the n-1 API metadata;
generating an alert based on the identified at least one difference;
rendering a user interface, wherein the rendered user interface includes the generated alert;
receiving selection at the user interface of an acceptance instructions, in response to rendering the generated alert;
receiving at least one updated value for a payload of the API automate, the payload including test data; and
generating an updated API automate including an updated payload for the n API.

11. The method of claim 10, further comprising:
executing the API automate with the n API and outputting an API automate status; and
in a case the API automate status is failed, comparing the n API metadata to the n-1 API metadata.

12. The method of claim 11, wherein:
a structure of the payload for the API automate is the n-1 API metadata; and
a structure of the updated payload for the updated API automate is the n API metadata.

13. The method of claim 11, wherein the updated payload includes a replacement of a value in the payload of the API automate for the n-1 API resulting in the updated API automate.

14. The method of claim 10, wherein each of the n API metadata and the n-1 API metadata includes at least one entity including one or more properties, and each property includes one or more attributes.

15. The method of claim 14, wherein identifying the at least one difference further comprises:
selecting each property in the n API metadata;
determining whether a corresponding property exists in the n-1 API metadata; and
in a case the corresponding property does not exist, the at least one difference is identified,
wherein the corresponding property does not exist in a case the corresponding property is not an exact match to the selected property in the n API metadata.

16. A non-transitory, computer readable medium having executable instructions stored therein to perform a method, the method comprising:
generating an API automate for a particular release (n-1) API, the n-1 API including n-1 API metadata;
receiving a new release (n) API including n version API metadata;
comparing the n API metadata to the n-1 API metadata;
identifying at least one difference between the n API metadata and the n-1 API metadata;
generating an alert based on the identified at least one difference;
rendering a user interface, wherein the rendered user interface includes the generated alert;
receiving selection at the user interface of an acceptance instruction, in response to rendering of the generated alert;

receiving at least one updated value for a payload of the API automate the payload including test data; and generating an updated API automate including an updated payload for the n API.

17. The medium of claim 16 further comprising:

executing the API automate with the n API and outputting an API automate status; and in a case the API automate status is failed, comparing the n API metadata to the n−1 API metadata.

* * * * *